US012275042B2

(12) United States Patent
Wang et al.

(10) Patent No.: US 12,275,042 B2
(45) Date of Patent: Apr. 15, 2025

(54) FULL-AUTOMATIC HIGH-PRESSURE SPRAY CLEANING AND RUST PREVENTION DEVICE AND APPLICATION METHOD THEREOF

(71) Applicant: GUANGDONG UNIVERSITY OF TECHNOLOGY, Guangzhou (CN)

(72) Inventors: Guan Wang, Guangzhou (CN); Guohua Chen, Guangzhou (CN); Junxian Li, Guangzhou (CN); Sihao Lin, Guangzhou (CN); Jieyu Zhu, Guangzhou (CN); Lei Guan, Guangzhou (CN); Zanfeng Liu, Sihui (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 328 days.

(21) Appl. No.: 18/154,817

(22) Filed: Jan. 14, 2023

(65) Prior Publication Data

US 2023/0294140 A1 Sep. 21, 2023

(30) Foreign Application Priority Data

Mar. 15, 2022 (CN) ........................ 202210255784.7

(51) Int. Cl.

| | |
|---|---|
| ***B08B 3/02*** | (2006.01) |
| ***B05B 16/20*** | (2018.01) |
| ***F26B 21/00*** | (2006.01) |

(52) U.S. Cl.

CPC ................ *B08B 3/02* (2013.01); *B05B 16/20* (2018.02); *F26B 21/00* (2013.01)

(58) Field of Classification Search

CPC ........................................................ B08B 3/02

See application file for complete search history.

(56) References Cited

FOREIGN PATENT DOCUMENTS

| | | |
|---|---|---|
| CN | 205732063 U | 11/2016 |
| CN | 207494104 U | 6/2018 |
| CN | 211989923 U | 11/2020 |
| CN | 213255894 U | 5/2021 |
| CN | 214488013 U | 10/2021 |

*Primary Examiner* — Jason Y Ko

(57) ABSTRACT

Disclosed are a full-automatic high-pressure spray cleaning and rust prevention device and an application method thereof. The device comprises a cleaning platform, a center rod and a swingable clamp module; the center rod is arranged on the cleaning platform, and an upper end is fixedly provided with the swingable clamp module; the swingable clamp module comprises a worm gear and worm assembly and a clamp, and the worm gear and worm assembly is capable of driving the clamp to deflect up and down; a driving mechanism arranged in a bottom portion of the cleaning platform is in driving connection with the center rod, so that the center rod is capable of driving the swingable clamp module to realize vertical lifting motion and rotary station switching; and the cleaning platform is sequentially provided with a positioning and spraying area, an air-drying area and a rust prevention area around the center rod.

10 Claims, 4 Drawing Sheets

FULL-AUTOMATIC HIGH-PRESSURE SPRAY CLEANING AND RUST PREVENTION DEVICE AND APPLICATION METHOD THEREOF

CROSS REFERENCE TO RELATED APPLICATIONS

This application claims foreign priority of Chinese Patent Application No. 202210255784.7, filed on Mar. 15, 2022 in the China National Intellectual Property Administration, the disclosures of all of which are hereby incorporated by reference.

TECHNICAL FIELD

The present invention belongs to the technical field of automatic cleaning equipment, specifically relates to a full-automatic high-pressure spray cleaning and rust prevention device and an application method thereof, and particularly relates to a full-automatic high-pressure spray cleaning and rust prevention device for an engine connecting rod and an application method thereof.

BACKGROUND OF THE PRESENT INVENTION

As a unique cleaning technology, high-pressure spray cleaning technology has been widely applied in cleaning processes of various technologies. Compared with brushing, dipping and ordinary spray cleaning, high-pressure spraying has the advantages of low cleaning cost, high cleaning speed and high cleaning quality. The high-pressure spray cleaning is characterized by using a pressure higher than that of traditional spray cleaning and selecting a special nozzle to position and clean a workpiece, so that the workpiece can be cleaned more effectively.

In a cleaning and rust prevention technology of an engine connecting rod, the key point is whether the cleaned engine connecting rod can meet a cleanliness requirement, wherein since a small-head hole bushing of the engine connecting rod is mounted by interference pressing, there is a small gap in a position of the small hole bushing, and there are a lot of metal impurity particles and burrs in the gap. If the engine connecting rod is vertically washed by high-pressure spraying directly, it is difficult to clean out particle impurities in the gap, and it is also possible to wash impurities deep into the gap to be stuck in the gap.

Manual cleaning is used in most traditional cleaning methods for the engine connecting rod, which not only consumes a lot of time and energy and has a low cleaning efficiency, but also endangers the health of cleaning operators due to long-term contact with a cleaning liquid. Ordinary spraying is used in most existing cleaning equipment for the engine connecting rod in the market, in which the cleaning does not focus on the small-head hole bushing gap of the engine connecting rod, so that it is difficult to clean out the impurities in the small-head hole bushing gap, thus being unable to meet an increasingly strict cleanliness requirement of the engine connecting rod. At present, most full-automatic high-pressure spraying equipment in the market is large-scale assembly-line technical equipment, in which unidirectional washing is basically used to complete integral cleaning of the engine connecting rod, and it is necessary to arrange a complex first high-pressure spraying device. Meanwhile, a large amount of cleaning liquid is needed, and a whole technical device has a complex structure, a huge volume and a high cost, which not only occupies a large space, but also wastes a large amount of cleaning liquid, resulting in a high cleaning cost.

SUMMARY OF PRESENT INVENTION

Aiming at the above defects in the prior art, the present invention is intended to provide a full-automatic high-pressure spray cleaning and rust prevention device and an application method thereof based on a high-pressure spray cleaning technology. The device not only can be used for integrally cleaning an engine connecting rod, but also can be used for specially performing fixed-angle inclined cleaning on a small-head hole bushing gap part of the engine connecting rod which is difficult to clean, and can be used for air-drying and spraying a rust prevention liquid in time, and is energy-saving and efficient in cleaning, simple in structure, small in size, capable of saving cleaning liquid, and low in cost.

In order to achieve the technical objective above, the following technical solution is used in the present invention.

A full-automatic high-pressure spray cleaning and rust prevention device comprises a cleaning platform, a center rod and a swingable clamp module, wherein the center rod is arranged on the cleaning platform, and an upper end is fixedly provided with the swingable clamp module;

- the swingable clamp module comprises a worm gear and worm assembly and a clamp for clamping a workpiece to be cleaned, and the worm gear and worm assembly is capable of driving the clamp to deflect up and down;
- a driving mechanism is arranged in a bottom portion of the cleaning platform, and the driving mechanism is in driving connection with the center rod, so that the center rod is capable of driving the swingable clamp module to realize a vertical lifting motion and rotary station switching; and
- the cleaning platform is sequentially provided with a positioning and spraying area, an air-drying area and a rust prevention area around the center rod; the positioning and spraying area is provided with a high-pressure spraying device used for positioning and cleaning the workpiece at a certain inclination angle; and the air-drying area and the rust prevention area are used for sequentially performing air-drying and spraying of a rust prevention liquid on the cleaned workpiece on the cleaned workpiece.

Further, the high-pressure spraying device of the positioning and spraying area comprises a first high-pressure spraying device and a second high-pressure spraying device; the positioning and spraying area is provided with a positioning device used for horizontally positioning and placing the workpiece to be cleaned; the positioning device is provided with the second high-pressure spraying device on one side close to the center rod, and the second high-pressure spraying device is used for performing spray cleaning on a first end of the workpiece to be cleaned in cooperation with the positioning device; and the positioning device is provided with a first high-pressure spraying device on one side far away from the center rod, the first high-pressure spraying device is used for positioning and cleaning a second end of the workpiece to be cleaned at a certain inclination angle in cooperation with the swingable clamp module, and the inclination angle ranges from 30° to 60°.

Further, the positioning device is a plurality of positioning pins, a lower end of the workpiece to be cleaned is provided with a positioning hole in clearance fit with the positioning pin, and the workpiece to be cleaned is positioned and placed on the positioning pin through the positioning hole; two second high-pressure spraying devices are provided, and the two second high-pressure spraying devices are respectively arranged on two sides of the first end of the workpiece to be cleaned; and a fan-shaped nozzle is arranged in the second high-pressure spraying device.

Further, the worm gear and worm assembly comprises a worm, a worm gear, a first rocker, a second rocker, a motor, a fixed connecting plate, a U-shaped fixed bracket and a fixed connecting rod; and the fixed connecting rod is vertically and fixedly connected to a middle cross bar of the U-shaped fixed bracket;

an upper end of the fixed connecting rod is hinged with a first end of the first rocker, a second end of the first rocker is hinged with a first end of the second rocker, a second end of the second rocker is hinged with a worm gear center of the worm gear, and a length of the second rocker is smaller than a worm gear radius of the worm gear; and a bottom end of the fixed connecting rod is hinged with the motor, the motor is in driving connection with the worm, the worm is in rotation fit with the worm gear, and the motor is driven to deflect up and down under a movable connection action of the first rocker and the second rocker, and meanwhile, the motor is fixedly connected with the clamp through the fixed connecting plate, thus driving the clamp to deflect up and down.

Further, an annular spraying area is also arranged between the positioning and spraying area and the air-drying area, the annular spraying area is provided with an annular high-pressure spraying device, and a plurality of fan-shaped high-pressure spraying nozzles are arranged on an inner wall of an annular shell of the annular high-pressure spraying device to form at least one annular spraying nozzle structure; the air-drying area is provided with an annular air-drying device, and at least one annular air outlet is arranged on an inner wall of an annular shell of the annular air-drying device; and the rust prevention area is provided with an annular rust prevention device, and a plurality of fan-shaped rust prevention liquid nozzles are uniformly arranged on an inner wall of an annular shell of the annular rust prevention device at intervals to form at least one annular rust prevention liquid nozzle structure.

Further, two ends of the annular high-pressure spraying device, the annular air-drying device and the annular rust prevention device are all provided with an infrared induction device.

Further, the annular spraying area, the air-drying area and the rust prevention area are all provided with a servo motor and a linear guide rail perpendicular to the center rod; and the servo motor is capable of driving an annular device on a corresponding station to reciprocate along the linear guide rail to be close to or far away from the center rod.

Further, the cleaning platform has a disc structure with a high exterior and a low interior, and the positioning and spraying area, the annular spraying area, the air-drying area and the rust prevention area are provided with a baffle for separation; and a center position of the cleaning platform is provided with a cleaning waste liquid recycling pipeline and a rust prevention waste liquid recycling pipeline, the cleaning waste liquid recycling pipeline is communicated with a cleaning waste liquid recycling device, and the rust prevention waste liquid recycling pipeline is communicated with a rust prevention waste liquid recycling device.

In addition, the present invention further provides a full-automatic high-pressure spray cleaning and rust prevention method for an engine connecting rod, using the full-automatic high-pressure spray cleaning and rust prevention device above, wherein the method comprises the following steps of:

step S1: placing the engine connecting rod in the positioning and spraying area, and performing preliminary spray cleaning on a large-head hole end of the engine connecting rod by the second high-pressure spraying device in cooperation with the positioning device first; and after finishing the preliminary spray cleaning, clamping the engine connecting rod to an operating position by the swingable clamp module, and positioning and cleaning a small-head hole end of the engine connecting rod at a certain inclination angle by the first high-pressure spraying device in cooperation with the swingable clamp module;

step S2: after finishing the positioning and cleaning, driving the swingable clamp module to rotate to the annular spraying area by the center rod, and placing the engine connecting rod in a center of an annular shell of the annular high-pressure spraying device; and under driving of the servo motor, making the annular high-pressure spraying device reciprocate along the linear guide rail to perform 360-degree annular washing on the engine connecting rod, and inducing a position of the engine connecting rod by the infrared induction device to control a reciprocating stroke;

step S3: after finishing the annular washing, driving the swingable clamp module to rotate to the air-drying area by the center rod, and placing the engine connecting rod in a center of an annular shell of the annular air-drying device; and under driving of the servo motor, making the annular air-drying device reciprocate along the linear guide rail to perform 360-degree annular air-drying on the engine connecting rod, and inducing the position of the engine connecting rod by the infrared induction device to control the reciprocating stroke;

step S4: after finishing the annular air-drying, driving the swingable clamp module to rotate to the rust prevention area by the center rod, and placing the engine connecting rod in a center of an annular shell of the annular rust prevention device; and under driving of the servo motor, making the annular rust prevention device reciprocate along the linear guide rail to spray the rust prevention liquid on the engine connecting rod, and inducing the position of the engine connecting rod by the infrared induction device to control the reciprocating stroke; and step S5: after finishing the rust prevention, driving the clamp to move downwardly by the center rod, and making the clamp release the engine connecting rod on the cleaning platform, so as to finish the cleaning and rust prevention of the connecting rod; and making the clamp return to an initial position, and sequentially repeating the above operations on the next workpiece.

Further, the step S1 specifically comprises:

step S101: horizontally placing the engine connecting rod in the positioning device of the positioning and spraying area, and making a small-head hole position of the connecting rod close to the first high-pressure spraying device and making a large-head hole position of the connecting rod close to the second high-pressure spraying device; and starting the second high-pressure spraying device, performing spray cleaning on a top portion and two side edges of a large-head hole, and performing preliminary cleaning on the large-head hole end of the engine connecting rod;

step S102: after finishing the preliminary cleaning, driving the clamp to descend by the center rod, making the clamp clamp the connecting rod from two side edges of the cleaned connecting rod and making the connecting rod rise to the operating position, and under a driving action of the worm gear and worm assembly, making the clamp swing upwardly to a certain inclination angle to be fixed, and starting the first high-pressure spraying device to perform high-pressure spray cleaning on a lower end surface of a small-head hole bushing gap of the connecting rod, wherein the inclination angle ranges from 30° to 60°;

step S103: after finishing the cleaning of the lower end surface of the small-head hole bushing gap of the connecting rod, driving the clamp to swing downwardly to an opposite end by the worm gear and worm assembly and fixing the clamp at a certain inclination angle, and driving the clamp to rise by the center rod at the same time, so that an upper end surface of the small-head hole bushing gap is located at the same position as the lower end surface of the small-head hole bushing gap cleaned in the step S102, and continuously cleaning the upper end surface of the small-head hole bushing gap of the connecting rod by the first high-pressure spraying device; and step S104: driving the clamp to straighten by the worm gear and worm assembly, and driving the clamp to rotate to the next station by the center rod.

Compared with the prior art, the present invention has the following beneficial effects:

(1) in the prior art, the high-pressure spraying is directly used to vertically wash the two end surfaces of the engine connecting rod, especially the small-head hole bushing gap position, so that it is difficult to clean out particle impurities in the gap, and it is possible to wash impurity particles deep into the gap to be stuck in the gap; and different from the prior art, according to the full-automatic high-pressure spray cleaning and rust prevention device provided by the present invention, based on the high-pressure spraying technology, the inclination angle of clamping of the engine connecting rod may be adjusted through the swingable clamp module, and the small-head hole bushing gap position of the engine connecting rod is positioned and cleaned at a certain inclination angle in cooperation with the high-pressure spraying device, so that the problem that it is difficult to clean out the impurities in the small-head hole bushing gap of the connecting rod can be effectively solved, thus meeting a cleanliness requirement;

(2) according to the full-automatic high-pressure spray cleaning and rust prevention device provided by the present invention, the annular devices are used to sequentially perform 360-degree annular washing, air-drying and spraying of the rust prevention liquid on the positioned and cleaned engine connecting rod, so that an integral structure of the engine connecting rod can be effectively cleaned and rust can be effectively prevented; and meanwhile, when technical measures such as washing, air-drying and spraying of the rust prevention liquid are performed, the annular device is controlled to reciprocate along the linear guide rail by the servo motor, and the position of the engine connecting rod is induced by the infrared induction devices arranged at two ends of the annular device to control the reciprocating stroke, so that effects and efficiencies of washing, air-drying and rust prevention can be further improved, thus being efficient and energy-saving;

(3) the full-automatic device is used in the present invention, a multi-functional integrated automatic operating process is realized through a rotatable center platform structure, and the cleaning liquid and the rust prevention liquid can be respectively recycled through separation by the baffle, with a good cleaning effect and a high cleaning quality, so that operators can be avoided from contacting with the cleaning liquid for a long time, and waste of the cleaning liquid can be reduced; and (4) according to the full-automatic high-pressure spray cleaning and rust prevention device provided by the present invention, mature industrial machinery products are used as various parts, which are universal and easy to purchase and maintain; and the integral structure is simple and compact, the occupied space is small, and the disassembly and maintenance are convenient.

DESCRIPTION OF REFERENCE NUMERALS

Figure 1:
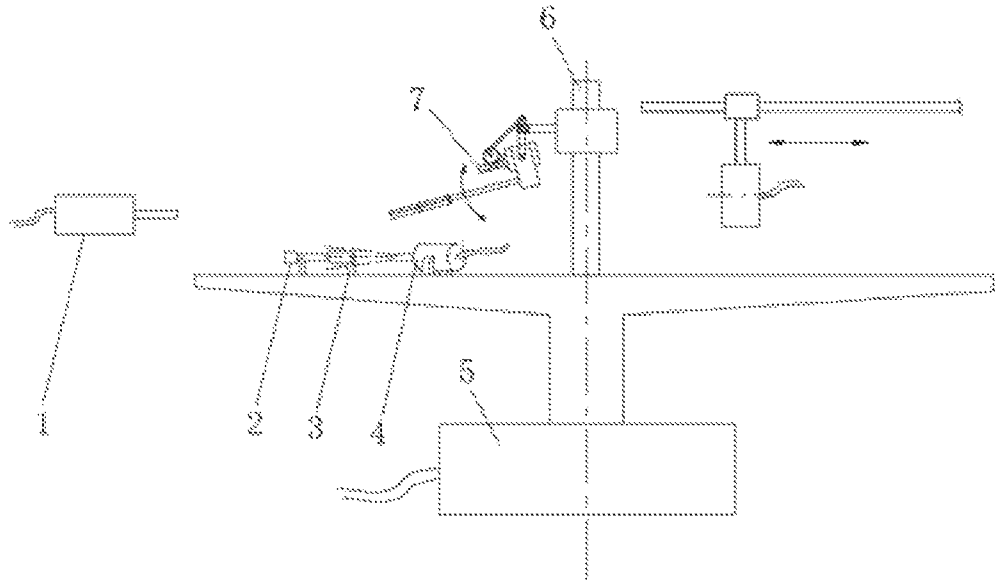
FIG. 1 is a front view of a full-automatic high-pressure spray cleaning and rust prevention device in First Embodiment of the present invention.
Figure 2:
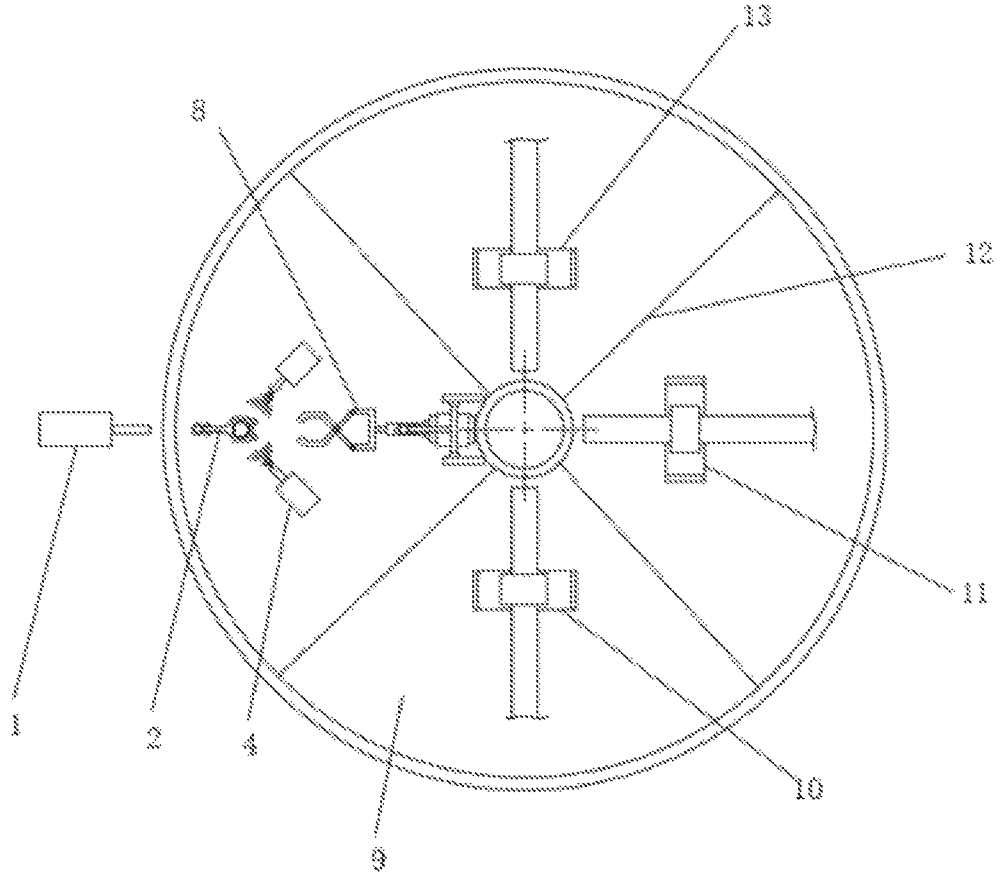
FIG. 2 is a top view of the full-automatic high-pressure spray cleaning and rust prevention device in First Embodiment of the present invention.

1 refers to first high-pressure spraying device; 2 refers to engine connecting rod; 3 refers to positioning pin; 4 refers to second high-pressure spraying device; 5 refers to waste liquid recycling device; 6 refers to center rod; 7 refers to worm gear and worm assembly; 8 refers to clamp; 9 refers to cleaning the platform; 10 refers to annular rust prevention device; 11 refers to annular air-drying device; 12 refers to baffle; 13 refers to annular high-pressure spraying device;

71 refers to worm; 72 refers to worm gear; 73 refers to first rocker; 74 refers to second rocker; 75 refers to motor; 76 refers to fixed connecting plate; 77 refers to U-shaped fixed bracket; 78 refers to fixed connecting rod;

131 refers to nozzle; 132 refers to annular shell; 133 refers to pipeline cavity; 134 refers to nozzle valve; 135 refers to infrared induction device; and 136 refers to linear guide rail.

DETAILED DESCRIPTION OF PREFERRED EMBODIMENTS

The technical solution in the embodiments of the present invention will be clearly and completely described hereinafter with reference to the drawings in the embodiments of the present invention. Apparently, the described embodiments are only some but not all of the embodiments of the present invention. Based on the embodiments in the present invention, all other embodiments obtained by those of ordinary skills in the art without going through any creative work should fall within the scope of protection of the present invention.

In the description of the present invention, it should be understood that the orientation or position relationship indicated by the terms "coaxial", "bottom", "one end", "top", "middle", "the other end", "up", "one side", "top", "inside", "front", "center", "two ends", and the like is based on the orientation or position relationship shown in the drawings, it is only for the convenience of description of the present invention and simplification of the description, and it is not to indicate or imply that the indicated device or element must have a specific orientation, and be constructed and operated in a specific orientation. Therefore, the terms should not be understood as limiting the present invention.

In the present invention, the terms "installation", "setting", "connection", "fixation", "rotary connection", and the like should be understood in broad sense unless otherwise specified and defined. For example, they may be fixed connection, removable connection or integrated connection; may be mechanical connection or electrical connection; and may be direct connection, or indirect connection through an intermediate medium, and connection inside two components, or interaction relation of two elements. Unless otherwise explicitly defined, the specific meanings of the above terms in the present invention may be understood by those of ordinary skills in the art according to specific situations.

First Embodiment

As shown in FIG. 1 to FIG. 4, the present invention provides a full-automatic high-pressure spray cleaning and rust prevention device, which comprises a cleaning platform 9, a center rod 6 and a swingable clamp module. The center rod 6 is arranged on the cleaning platform 9, and an upper end is fixedly provided with the swingable clamp module. The swingable clamp module comprises a worm gear and worm assembly 7 and a clamp 8 for clamping a workpiece to be cleaned. The worm gear and worm assembly 7 is fixedly arranged on the center rod 6, and the worm gear and worm assembly 7 is capable of driving the clamp 8 to deflect up and down.

A driving mechanism is arranged in a bottom portion of the cleaning platform 9, and the driving mechanism is in driving connection with the center rod 6, so that the center rod 6 is capable of driving the swingable clamp module to realize a vertical lifting motion and rotary station switching. In some embodiments, the driving mechanism may be realized in various ways, for example, an existing rotary lifting platform may be used, or combination modes such as a hydraulic cylinder—a rotary motor or a screw (driven by a motor)—a ball spline may also be used.

The cleaning platform 9 is sequentially provided with a positioning and spraying area, an annular spraying area, an air-drying area and a rust prevention area around the center rod 6. The positioning and spraying area is provided with a high-pressure spraying device used for positioning and cleaning the workpiece at a certain inclination angle, wherein the inclination angle ranges from 30° to 60°. The annular spraying area, the air-drying area and the rust prevention area are used for sequentially performing annular cleaning, air-drying and spraying of a rust prevention liquid on the positioned and cleaned workpiece in the positioning and spraying area.

Figure 3:
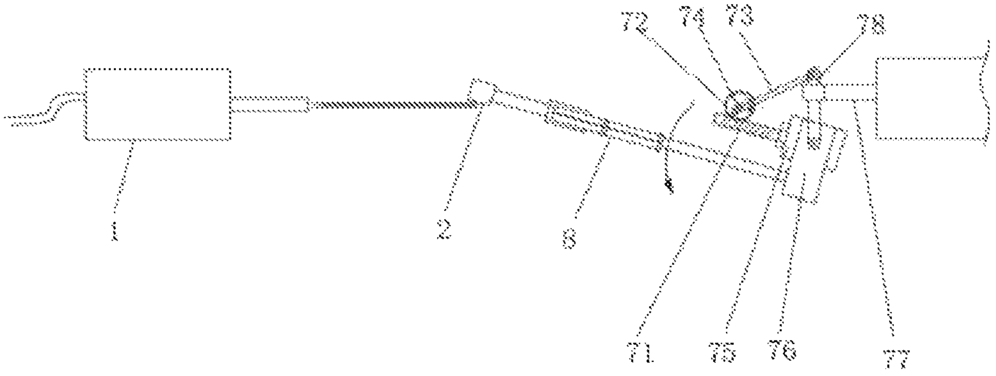
FIG. 3 is a schematic structural diagram of a swingable clamp in cleaning a lower end surface of a small-head hole of a connecting rod in First Embodiment of the present invention.
Figure 4:
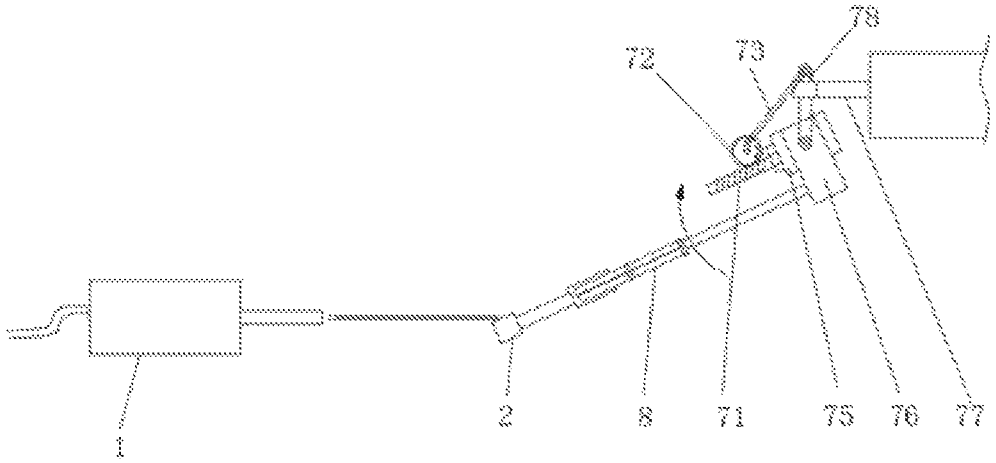
FIG. 4 is a schematic structural diagram of the swingable clamp in cleaning an upper end surface of the small-head hole of the connecting rod in First Embodiment of the present invention.

Specifically, as shown in FIG. 3 and FIG. 4, the worm gear and worm assembly 7 comprises a worm 71, a worm gear 72, a first rocker 73, a second rocker 74, a motor 75, a fixed connecting plate 76, a U-shaped fixed bracket 77 and a fixed connecting rod 78. The fixed connecting rod 78 is vertically and fixedly connected to a middle cross bar of the U-shaped fixed bracket 77.

An upper end of the fixed connecting rod 78 is hinged with a first end of the first rocker 73, a second end of the first rocker 73 is hinged with a first end of the second rocker 74, a second end of the second rocker 74 is hinged with a worm gear center of the worm gear 72, and a length of the second rocker 74 is smaller than a worm gear radius of the worm gear 72.

A bottom end of the fixed connecting rod 78 is hinged with the motor 75, the motor 75 is in driving connection with the worm 71, the worm 71 is in rotation fit with the worm gear 72, and the motor 75 is driven to deflect up and down under a movable connection action of the first rocker 73 and the second rocker 74, and meanwhile, the motor 74 is fixedly connected with the clamp 8 through the fixed connecting plate 76, thus driving the clamp 8 to deflect up and down.

The high-pressure spraying device of the positioning and spraying area comprises a first high-pressure spraying device 1 and a second high-pressure spraying device 4. The positioning and spraying area is provided with a positioning device, the positioning device comprises a plurality of positioning pins 3, a lower end of an engine connecting rod 2 of the workpiece to be cleaned is provided with a positioning hole in clearance fit with the positioning pin, the engine connecting rod 2 is positioned and placed on the positioning pin 3 through the positioning hole, and a large-head hole end of the connecting rod is oriented to the second high-pressure spraying device 4 and a small-head hole end of the connecting rod is oriented to the first high-pressure spraying device 1. The second high-pressure spraying device 4 is arranged close to the center rod 6, the second high-pressure spraying device 4 is two small-scale high-pressure spraying devices in which fan-shaped nozzles are arranged, and the two second high-pressure spraying devices 4 are respectively arranged on two sides of the large-head hole end of the engine connecting rod 2 and used for performing preliminary spray cleaning on a top end and two side edges of the large-head hole end of the engine connecting rod 2. The first high-pressure spraying device 1 is arranged above an outer side of the cleaning platform 9, after finishing the cleaning of the second high-pressure spraying device 4, as shown in FIG. 3, the center rod 6 drives the clamp 8 to descend, the clamp 8 clamps the engine connecting rod 2 from two side edges of the cleaned connecting rod and rises the engine connecting rod to an operating position, and under a driving action of the worm gear and worm assembly 7, the clamp 8 swings upwardly to a certain inclination angle to be fixed, and the first high-pressure spraying device 1 is started to perform high-pressure spray cleaning on a lower end surface of a small-head hole bushing gap of the connecting rod. After finishing the cleaning of the lower end surface of the small-head hole bushing gap of the connecting rod, as shown in FIG. 4, the worm gear and worm assembly 7 drives the clamp 8 to swing downwardly to an opposite end and fixes the clamp at a certain inclination angle, and meanwhile, the center rod 6 drives the clamp 8 to rise, so that an upper end surface of the small-head hole bushing gap is located at the same position as the lower end surface of the small-head hole bushing gap cleaned above, and the first high-pressure spraying device 1 continuously cleans the upper end surface of the small-head hole bushing gap of the connecting rod. Finally, the worm gear and worm assembly 7 drives the clamp 8 to straighten, and the center rod 6 drives the clamp 8 to rotate to the next station, thus finishing the cleaning of the small-head hole bushing gap of the connecting rod.

Figure 5:
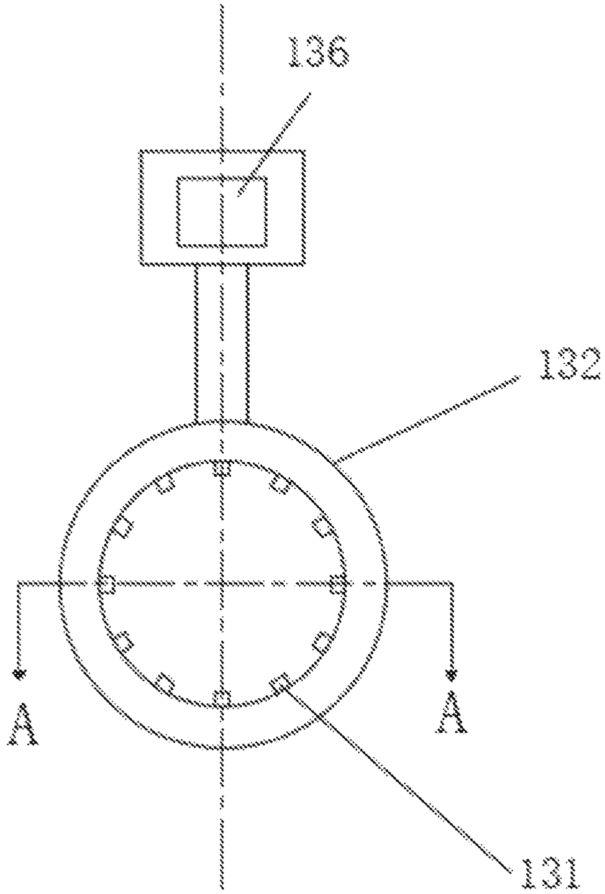
FIG. 5 is a front view of an annular device in First Embodiment of the present invention.
Figure 6:
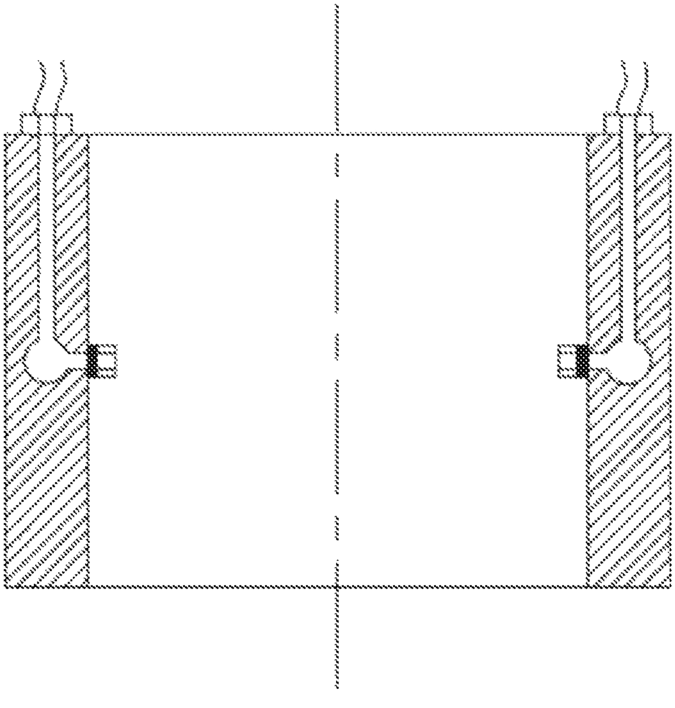
FIG. 6 is a sectional view of the annular device in First Embodiment of the present invention at an A-A part.

The annular spraying area is provided with an annular high-pressure spraying device 13, with reference to FIG. 5 and FIG. 6, the annular high-pressure spraying device 13 comprises an annular shell 132, a plurality of fan-shaped high-pressure spraying nozzles 131 are arranged on an inner wall of the annular shell 132, the nozzle 131 is communicated with a cleaning liquid pipeline, and the plurality of fan-shaped high-pressure spraying nozzles 131 form a single annular spraying nozzle structure, which may be used for performing 360-degree annular cleaning on the engine connecting rod. Similarly, the air-drying area is provided with an annular air-drying device 11, and an annular air outlet is arranged on an inner wall of an annular shell of the annular air-drying device 11. The rust prevention area is provided with an annular rust prevention device 10, and a plurality of fan-shaped rust prevention liquid nozzles are uniformly arranged on an inner wall of an annular shell of the annular rust prevention device 10 at intervals to form a single annular rust prevention liquid nozzle structure. The annular spraying area, the air-drying area and the rust prevention area are all provided with a servo motor and a linear guide rail 136 perpendicular to the center rod 6, a specific arrangement position of the linear guide rail may be adjusted according to needs of a workbench, and in the embodiment, the linear guide rail 136 is arranged above the cleaning platform 9. The servo motor is capable of driving an annular device on a corresponding station to reciprocate along the linear guide rail 136 to be close to or far away from the center rod 6.

Second Embodiment

The following improvements are made in Second Embodiment based on First Embodiment.

Figure 7:
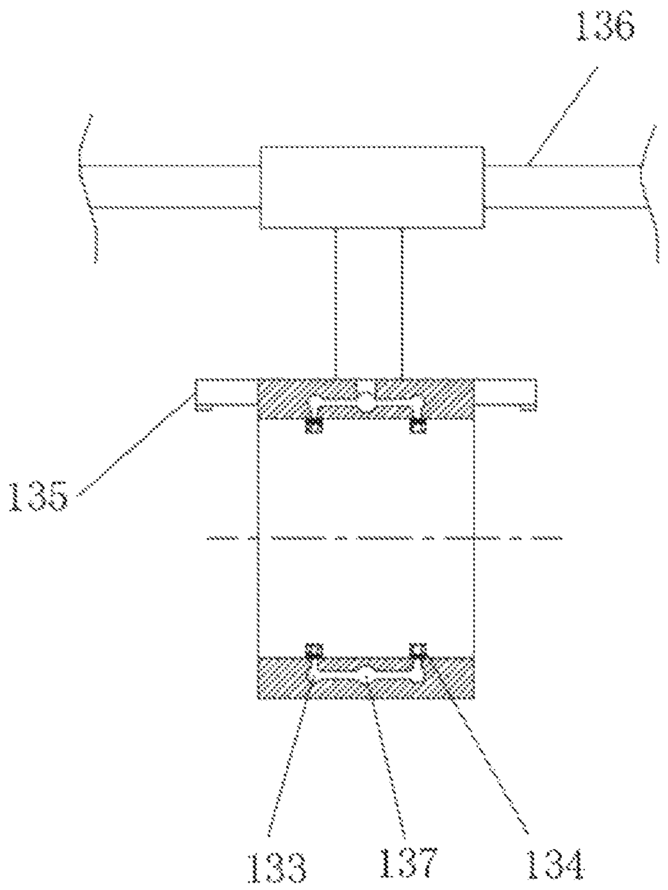
FIG. 7 is a local sectional view of an annular device in Second Embodiment of the present invention from a side perspective.

In order to improve effect and efficiency of annular cleaning, the annular nozzle on the inner wall of the annular shell of the annular high-pressure spraying device 13 may be arranged in a multi-annular spraying nozzle structure. For example, in the embodiment, with reference to FIG. 7, the annular high-pressure spraying device 13 has a double-annular spraying nozzle structure, and two nozzle valves 134 arranged side by side are communicated with a main pipeline cavity 137 through a branch pipeline cavity 133, and the main pipeline cavity 137 is communicated with the cleaning liquid pipeline. Similarly, the annular air-drying device 11 and the annular rust prevention device 10 may also be improved and adjusted in the same way. In addition, two ends of the annular high-pressure spraying device 13, the annular air-drying device 11 and the annular rust prevention device 10 are all provided with an infrared induction device used for inducing a position of the engine connecting rod to control a reciprocating stroke, thus being energy-saving and efficient.

In addition, the cleaning platform 9 has a disc structure with a high exterior and a low interior, and the positioning and spraying area, the annular spraying area, the air-drying area and the rust prevention area are provided with a baffle 12 for separation. A center position of the cleaning platform 9 is provided with a cleaning waste liquid recycling pipeline and a rust prevention waste liquid recycling pipeline, the cleaning waste liquid recycling pipeline is communicated with a cleaning waste liquid recycling device, and the rust prevention waste liquid recycling pipeline is communicated with a rust prevention waste liquid recycling device, so that the cleaning liquid and the rust prevention liquid can be recycled respectively.

Third Embodiment

A full-automatic high-pressure spray cleaning and rust prevention method for an engine connecting rod uses the full-automatic high-pressure spray cleaning and rust prevention device in Second Embodiment, wherein the method comprises the following steps of:

step S1: placing the engine connecting rod 2 in the positioning and spraying area, and performing preliminary spray cleaning on a large-head hole end of the engine connecting rod 2 by the second high-pressure spraying device 4 in cooperation with the positioning device first; and after finishing the preliminary spray cleaning, clamping the engine connecting rod 2 to an operating position by the swingable clamp module, and positioning and cleaning a small-head hole end of the engine connecting rod 2 at a certain inclination angle by the first high-pressure spraying device 1 in cooperation with the swingable clamp module, wherein the inclination angle may range from 30° to 60°;

step S2: after finishing the positioning and cleaning, driving the swingable clamp module to rotate to the annular spraying area by the center rod 6, and placing the engine connecting rod 2 in a center of an annular shell of the annular high-pressure spraying device 13; and under driving of the servo motor, making the annular high-pressure spraying device 13 reciprocate along the linear guide rail 136 to perform 360-degree annular washing on the engine connecting rod 2, and inducing a position of the engine connecting rod 2 by the infrared induction device to control a reciprocating stroke;

step S3: after finishing the annular washing, driving the swingable clamp module to rotate to the air-drying area by the center rod 6, and placing the engine connecting rod 2 in a center of an annular shell of the annular air-drying device 11; and under driving of the servo motor, making the annular air-drying device 11 reciprocate along the linear guide rail 136 to perform 360-degree annular air-drying on the engine connecting rod 2, and inducing the position of the engine connecting rod 2 by the infrared induction device to control the reciprocating stroke;

step S4: after finishing the annular air-drying, driving the swingable clamp module to rotate to the rust prevention area by the center rod 6, and placing the engine connecting rod 2 in a center of an annular shell of the annular rust prevention device 10; and under driving of the servo motor, making the annular rust prevention device 10 reciprocate along the linear guide rail 136 to spray the rust prevention liquid on the engine connecting rod 2, and inducing the position of the engine connecting rod 2 by the infrared induction device to control the reciprocating stroke; and step S5: after finishing the rust prevention, driving the clamp 8 to move downwardly by the center rod 6, and making the clamp 8 release the engine connecting rod 2 on the cleaning platform 9, so as to finish the cleaning and rust prevention of the connecting rod; and making the clamp 8 return to an initial position, and sequentially repeating the above operations on the next workpiece.

The step S1 specifically comprises:

step S101: horizontally placing the engine connecting rod 2 in the positioning device of the positioning and spraying area, and making a small-head hole position of the connecting rod close to the first high-pressure spraying device 1 and making a large-head hole position of the connecting rod close to the second high-pressure spraying device 4; and starting the second high-pressure spraying device 4, performing spray cleaning on a top portion and two side edges of a large-head hole, and performing preliminary cleaning on the large-head hole end of the engine connecting rod;

step S102: after finishing the preliminary cleaning, driving the clamp 8 to descend by the center rod 6, making the clamp 8 clamp the connecting rod from two side edges of the cleaned connecting rod and making the connecting rod rise to the operating position, and under a driving action of the worm gear and worm assembly 7, making the clamp 8 swing upwardly to a certain inclination angle to be fixed, and starting the first high-pressure spraying device 1 to perform high-pressure spray cleaning on a lower end surface of a small-head hole bushing gap of the connecting rod;

step S103: after finishing the cleaning of the lower end surface of the small-head hole bushing gap of the connecting rod, driving the clamp 8 to swing downwardly to an opposite end by the worm gear and worm assembly 7 and fixing the clamp at a certain inclination angle, and driving the clamp 8 to rise by the center rod 6 at the same time, so that an upper end surface of the small-head hole bushing gap is located at the same position as the lower end surface of the small-head hole bushing gap cleaned in the step S102, and continuously cleaning the upper end surface of the small-head hole bushing gap of the connecting rod by the first high-pressure spraying device 1; and step S104: driving the clamp 8 to straighten by the worm gear and worm assembly 7, and driving the clamp 8 to rotate to the next station by the center rod 6.

The above descriptions are merely the embodiments of the present application, and are not intended to limit the present invention. Any modification, equivalent substitution, improvement, and the like made within the scope of application of the present invention are included in the scope of protection of the present invention.

We claim:

1. A full-automatic high-pressure spray cleaning and rust prevention device, comprising a cleaning platform (9), a center rod (6) and a swingable clamp module, wherein the center rod (6) is arranged on the cleaning platform (9), and an upper end is fixedly provided with the swingable clamp module;

the swingable clamp module comprises a worm gear and worm assembly (7) and a clamp (8) for clamping a workpiece to be cleaned, and the worm gear and worm assembly (7) is capable of driving the clamp (8) to deflect up and down;

a driving mechanism is arranged in a bottom portion of the cleaning platform (9), and the driving mechanism is in driving connection with the center rod (6), so that the center rod (6) is capable of driving the swingable clamp module to realize a vertical lifting motion and rotary station switching; and the cleaning platform (9) is sequentially provided with a positioning and spraying area, an air-drying area and a rust prevention area around the center rod (6); the positioning and spraying area is provided with a high-pressure spraying device used for positioning and cleaning the workpiece at a certain inclination angle; and the air-drying area and the rust prevention area are used for sequentially performing air-drying and spraying of a rust prevention liquid on the cleaned workpiece.

2. The full-automatic high-pressure spray cleaning and rust prevention device according to claim 1, wherein the high-pressure spraying device of the positioning and spraying area comprises a first high-pressure spraying device (1) and a second high-pressure spraying device (4); the positioning and spraying area is provided with a positioning device used for horizontally positioning and placing the workpiece to be cleaned; the positioning device is provided with the second high-pressure spraying device (4) on one side close to the center rod (6), and the second high-pressure spraying device (4) is used for performing spray cleaning on a first end of the workpiece to be cleaned in cooperation with the positioning device; and the positioning device is provided with a first high-pressure spraying device (1) on one side far away from the center rod (6), the first high-pressure spraying device (1) is used for positioning and cleaning a second end of the workpiece to be cleaned at a certain inclination angle in cooperation with the swingable clamp module, and the inclination angle ranges from 30° to 60°.

3. The full-automatic high-pressure spray cleaning and rust prevention device according to claim 2, wherein the positioning device is a plurality of positioning pins (3), a lower end of the workpiece to be cleaned is provided with a positioning hole in clearance fit with the positioning pin, and the workpiece to be cleaned is positioned and placed on the positioning pin (3) through the positioning hole; two second high-pressure spraying devices (4) are provided, and the two second high-pressure spraying devices (4) are respectively arranged on two sides of the first end of the workpiece to be cleaned; and a fan-shaped nozzle is arranged in the second high-pressure spraying device.

4. The full-automatic high-pressure spray cleaning and rust prevention device according to claim 1, wherein the worm gear and worm assembly (7) comprises a worm (71), a worm gear (72), a first rocker (73), a second rocker (74), a motor (75), a fixed connecting plate (76), a U-shaped fixed bracket (77) and a fixed connecting rod (78); and the fixed connecting rod (78) is vertically and fixedly connected to a middle cross bar of the U-shaped fixed bracket (77);

an upper end of the fixed connecting rod (78) is hinged with a first end of the first rocker (73), a second end of the first rocker (73) is hinged with a first end of the second rocker (74), a second end of the second rocker (74) is hinged with a worm gear center of the worm gear (72), and a length of the second rocker (74) is smaller than a worm gear radius of the worm gear (72); and a bottom end of the fixed connecting rod (78) is hinged with the motor (75), the motor (75) is in driving connection with the worm (71), the worm (71) is in rotation fit with the worm gear (72), and the motor (75) is driven to deflect up and down under a movable connection action of the first rocker (73) and the second rocker (74), and meanwhile, the motor (74) is fixedly connected with the clamp (8) through the fixed connecting plate (76), thus driving the clamp (8) to deflect up and down.

5. The full-automatic high-pressure spray cleaning and rust prevention device according to claim 1, wherein an annular spraying area is also arranged between the positioning and spraying area and the air-drying area, the annular spraying area is provided with an annular high-pressure spraying device (13), and a plurality of fan-shaped high-pressure spraying nozzles (131) are arranged on an inner wall of an annular shell of the annular high-pressure spraying device (13) to form at least one annular spraying nozzle structure; the air-drying area is provided with an annular air-drying device (11), and at least one annular air outlet is arranged on an inner wall of an annular shell of the annular air-drying device (11); and the rust prevention area is provided with an annular rust prevention device (10), and a plurality of fan-shaped rust prevention liquid nozzles are uniformly arranged on an inner wall of an annular shell of the annular rust prevention device (10) at intervals to form at least one annular rust prevention liquid nozzle structure.

6. The full-automatic high-pressure spray cleaning and rust prevention device according to claim 5, wherein two ends of the annular high-pressure spraying device (13), the annular air-drying device (11) and the annular rust prevention device (10) are all provided with an infrared induction device.

7. The full-automatic high-pressure spray cleaning and rust prevention device according to claim 6, wherein the annular spraying area, the air-drying area and the rust prevention area are all provided with a servo motor and a linear guide rail (136) perpendicular to the center rod (6); and the servo motor is capable of driving an annular device on a corresponding station to reciprocate along the linear guide rail (136) to be close to or far away from the center rod (6).

8. The full-automatic high-pressure spray cleaning and rust prevention device according to claim 1, wherein the cleaning platform (9) has a disc structure with a high exterior and a low interior, and the positioning and spraying area, the annular spraying area, the air-drying area and the rust prevention area are provided with a baffle (12) for separation; and a center position of the cleaning platform (9) is provided with a cleaning waste liquid recycling pipeline and a rust prevention waste liquid recycling pipeline, the cleaning waste liquid recycling pipeline is communicated with a cleaning waste liquid recycling device, and the rust prevention waste liquid recycling pipeline is communicated with a rust prevention waste liquid recycling device.

9. A full-automatic high-pressure spray cleaning and rust prevention method for an engine connecting rod, using the full-automatic high-pressure spray cleaning and rust prevention device according to any one of claim 1, wherein the method comprises the following steps of:

step S1: placing the engine connecting rod (2) in the positioning and spraying area, and performing preliminary spray cleaning on a large-head hole end of the engine connecting rod (2) by the second high-pressure spraying device (4) in cooperation with the positioning device first; and after finishing the preliminary spray cleaning, clamping the engine connecting rod (2) to an operating position by the swingable clamp module, and positioning and cleaning a small-head hole end of the engine connecting rod (2) at a certain inclination angle by the first high-pressure spraying device (1) in cooperation with the swingable clamp module;

step S2: after finishing the positioning and cleaning, driving the swingable clamp module to rotate to the annular spraying area by the center rod (6), and placing the engine connecting rod (2) in a center of an annular shell of the annular high-pressure spraying device (13); and under driving of the servo motor, making the annular high-pressure spraying device (13) reciprocate along the linear guide rail (136) to perform 360-degree annular washing on the engine connecting rod (2), and inducing a position of the engine connecting rod (2) by the infrared induction device to control a reciprocating stroke;

step S3: after finishing the annular washing, driving the swingable clamp module to rotate to the air-drying area by the center rod (6), and placing the engine connecting rod (2) in a center of an annular shell of the annular air-drying device (11); and under driving of the servo motor, making the annular air-drying device (11) reciprocate along the linear guide rail (136) to perform 360-degree annular air-drying on the engine connecting rod (2), and inducing the position of the engine connecting rod (2) by the infrared induction device to control the reciprocating stroke;

step S4: after finishing the annular air-drying, driving the swingable clamp module to rotate to the rust prevention area by the center rod (6), and placing the engine connecting rod (2) in a center of an annular shell of the annular rust prevention device (10); and under driving of the servo motor, making the annular rust prevention device (10) reciprocate along the linear guide rail to spray the rust prevention liquid on the engine connecting rod (2), and inducing the position of the engine connecting rod (2) by the infrared induction device to control the reciprocating stroke; and step S5: after finishing the rust prevention, driving the clamp (8) to move downwardly by the center rod (6), and making the clamp (8) release the engine connecting rod (2) on the cleaning platform (9), so as to finish the cleaning and rust prevention of the connecting rod; and making the clamp (8) return to an initial position, and sequentially repeating the above operations on the next workpiece.

10. The full-automatic high-pressure spray cleaning and rust prevention method for the engine connecting rod according to claim 9, wherein the step S1 specifically comprises:

step S101: horizontally placing the engine connecting rod (2) in the positioning device of the positioning and spraying area, and making a small-head hole position of the connecting rod close to the first high-pressure spraying device (1) and making a large-head hole position of the connecting rod close to the second high-pressure spraying device (4); and starting the second high-pressure spraying device (4), performing spray cleaning on a top portion and two side edges of a large-head hole, and performing preliminary cleaning on the large-head hole end of the engine connecting rod;

step S102: after finishing the preliminary cleaning, driving the clamp (8) to descend by the center rod (6), making the clamp (8) clamp the connecting rod from two side edges of the cleaned connecting rod and making the connecting rod rise to the operating position, and under a driving action of the worm gear and worm assembly (7), making the clamp (8) swing upwardly to a certain inclination angle to be fixed, and starting the first high-pressure spraying device (1) to perform high-pressure spray cleaning on a lower end surface of a small-head hole bushing gap of the connecting rod, wherein the inclination angle ranges from 30° to 60°;

step S103: after finishing the cleaning of the lower end surface of the small-head hole bushing gap of the connecting rod, driving the clamp (8) to swing downwardly to an opposite end by the worm gear and worm assembly (7) and fixing the clamp at a certain inclination angle, and driving the clamp (8) to rise by the center rod (6) at the same time, so that an upper end surface of the small-head hole bushing gap is located at the same position as the lower end surface of the small-head hole bushing gap cleaned in the step S102, and continuously cleaning the upper end surface of the small-head hole bushing gap of the connecting rod by the first high-pressure spraying device (1); and step S104: driving the clamp (8) to straighten by the worm gear and worm assembly (7), and driving the clamp (8) to rotate to the next station by the center rod (6).

* * * * *